UNITED STATES PATENT OFFICE.

REX DE ORE McDILL, OF TAMPA, FLORIDA.

FOOD PRODUCT.

1,365,000.   Specification of Letters Patent.   Patented Jan. 11, 1921.

No Drawing.   Application filed November 10, 1919.  Serial No. 336,880.

*To all whom it may concern:*

Be it known that I, REX DE ORE McDILL, a citizen of the United States and a resident of Tampa, in the county of Hillsborough and State of Florida, have invented a new and useful Food Product, of which the following is a specification.

This invention is an improvement in food products and in the process of producing the same and relates to marmalades, jams, jellies, etc., and particularly in a base therefor, and the process of making the same, use being made of the pectin occurring in citrus fruits either with or without other components of such fruits and generally with components of other fruits, the pectin or pectin and other components of the citrus fruits being used as a base for the marmalades, jams, jellies, etc.

In practically all fruits other than citrus fruits the pectin content is in the juice. In citrus fruits the pectin content is in the white cellulose structure of the skin and cross walls as well as the outer covering of the seeds.

A feature of my invention is the preparation of the pectin in a dry state from citrus fruits, the same to be used in the making of marmalades, jams, jellies, etc., by combining therewith various other fruits. It is impossible to state the proportion of ingredients that is required for the manufacture of the base or of the dried fruit used for jelly-making, primarily because of the fact that as the season advances the fruit undergoes a complete chemical change and the pectin which is in the cellulose is more or less changed to sugar by ripening. The proper proportions of ingredients may be determined by conversion of some of the dry material into liquid pectin extract and testing it with a brix or Baumé hydrometer.

The following is an example of my process of making my base from citrus fruit, sweet orange, for example:

The orange is peeled very fine, that is, just enough to cut out the oil cells; it is then cut in two and the juice taken out; the seeds are strained out of the juice and macerated in cold water for twelve hours; the gelatinous mass is then strained from the seeds, the seeds being of no further use in the process; the gelatinous mass above mentioned which is high in pectin is poured into the pulp after it has been ground and mixed thoroughly and the resulting mass is then put into a drier and dried at about 150 degrees Fahrenheit. This is merely the dried pulp and parts of the orange which contain pectin and by using the sweet orange a jelly cannot be made without the addition of some other fruit acid; tartaric acid, citric acid or malic acid or any of the fruit juices containing these acids in sufficient quantities can be added to the dry base; macerated for five hours, boiled for ten minutes, again macerated for twelve hours and then brought to a boil and the juice strained off and it is then ready to make jelly or jam, which by the addition of sugar in accordance with the standard practice in jelly-making, will result in a jelly flavored only with fruit juice that has been added to the jelly, and in no way colored or flavored by its orange pectin content.

An example of the process of making marmalade is as follows:—

The fruit is washed and cut in half; the juice is then removed with the seeds; the white walls are removed, and in the case of sour orange, grape fruit and kumquat, the white skin is boiled in soda water for five minutes, removing the hesperdin or bitter content; it is then washed to remove the soda water in order that the soda will not neutralize the acid; the pulp is then comminuted, for example by graining or slicing or shredding, and to it the juice of the above-named fruit is added together with the seed extract; the whole is then dried. This material is then ready at any future date to be used in the manufacture of marmalade which is done simply by boiling the pulp in water and adding the proper amount of sugar. Jelly may likewise be made from this material by boiling the pulp in water, straining off the juice and following the method in jelly-making as outlined above.

My base may be used as such; or if the pulp is not desired in the finished product the base may be extracted with water and such extract used.

I claim:

1. A base for making marmalades, jams, jellies, etc., consisting of dried mixture of pulp and seed extract of citrus fruit.

2. A base for making marmalades, jams, jellies, etc., comprising comminuted, dehydrated white pulp of citrus fruit.

3. A base for making marmalades, jams, jellies, etc., consisting of a dry mixture of sliced outer peel, white pulp, and juices of citrus fruit.

4. A base for making marmalades, jams, jellies, etc., consisting of a dry mixture of sliced outer peel, white pulp, juices and the extract of seeds of citrus fruit.

REX DE ORE McDILL.